United States Patent
Bluhm et al.

[15] 3,674,806
[45] July 4, 1972

[54] 1,3,3,4,4-PENTASUBSTITUTED PYRROLIDINES

[72] Inventors: Herbert J. Bluhm; Eugene R. Fluck, both of Winston-Salem, N.C.

[73] Assignee: R. J. Reynolds Tobacco Company, Winston-Salem, N.C.

[22] Filed: April 30, 1969

[21] Appl. No.: 820,620

[52] U.S. Cl..................260/326.8, 260/296 R, 260/326.5 N, 260/326.5 M, 260/326.85, 424/263, 424/274
[51] Int. Cl. .........................................................C07d 27/02
[58] Field of Search.......................260/326.8, 326.85, 296 R

[56] References Cited

UNITED STATES PATENTS 2,852,526  9/1958  Villani et al. ........................260/326.8
3,236,859  2/1966  Wollweber et al................260/326.85
3,020,288  2/1962  Wragg et al..........................260/326.8

OTHER PUBLICATIONS

Boehringer et al., Chem. Abstracts, Vol. 58, pag 12, 517–a–e, June 1964 Abstracting British Patent 915,456 dated Jan. 16, 1963
Burger, Medicinal Chemistry, Second Edition, Interscience, page 497, 1960 RS 403 B8 1960 C.7

Primary Examiner—Alan L. Rotman
Attorney—Pendleton, Neuman, Williams & Anderson

[57] ABSTRACT

Novel 1,3,3,4,4-pentasubstituted pyrrolidines having pharmacological activity.

5 Claims, No Drawings

1,3,3,4,4-PENTASUBSTITUTED PYRROLIDINES

This invention relates to novel chemical compounds and the synthesis thereof.

The novel compounds of this invention are 1,3,3,4,4-pentasubstituted pyrrolidines which can be illustrated by the following structural formula

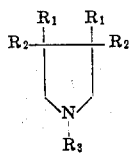

Formula I wherein $R_1$ and $R_2$ are alkyl, aryl, alkaryl or aralkyl groups containing not more than 10 carbon atoms. These groups may contain additional substituents such as halogen, nitro, alkoxy and the like. Representative groups include methyl, butyl, octyl, 2-nitrobutyl, phenyl, tolyl, p-methoxyphenyl, p-bromophenyl, p-isopropylphenyl, benzyl and the like.

$R_3$ is alkyl, hydroxyalkyl, dialkylamino, aryl, alkaryl aralkyl, pyridyl, pyridylmethyl or cycloalkyl containing not more than 12 carbon atoms. These groups may contain additional substituents such as halogen, nitro, alkoxy and the like. Representative groups include ethyl, butyl, dodecyl, diethyl-amino, p-nitrophenyl, o-tolyl, p-ethoxyphenyl, p-hydroxyphenyl, 2,4-dichlorophenyl, 2,4-dimethylphenyl, p-biphenylyl, 6-butoxy-3-pyridyl, 4-methyl-2-pyridyl, cyclopropyl, cyclopentyl and the like.

The novel compounds of this invention are prepared from imines containing an allylic hydrogen which, by oxidative coupling, yields succinaldimines. Alternatively, said succinaldimines can be prepared by oxidative coupling of the appropriate aldehyde followed by treatment with an appropriate amine. The succinaldimines are then reduced with concommitant cyclization to form the compounds of this invention. Bis(1,1-dialkylhydrazones) prepared from the succinaldehyde and appropriate hydrazine can also be reduced to give the corresponding 1-(dialkylamino)pyrrolidine.

The oxidative coupling of imines containing an allylic hydrogen to form succinaldimines is disclosed in copending application Ser. No. 759,750 filed Sept. 13, 1968, now abandoned by John Charles Leffingwell, which application is a continuation-in-part of a prior application, Ser. No. 595,001 filed Nov. 17, 1966, now abandoned. Patent application Ser. No. 27,173 filed Apr. 9, 1970 is in turn a continuation-in-part of said Ser. No. 759,750. Starting with a monomeric imine, the synthesis of the present compounds can be illustrated as follows, using manganese dioxide to achieve the coupling:

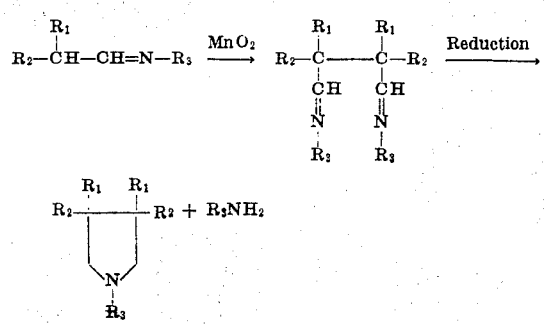

Oxidative coupling of an aldehyde to form a succinaldehyde is disclosed in the copending application Ser. No. 595,004, now abandoned, filed Nov. 17, 1966 by John Charles Leffingwell. Application Ser. No. 595,004 was replaced by Ser. No. 820,629, on which application U.S. Pat. No. 3,609,193 issued Sept. 28, 1971. The coupled aldehyde can then be reacted with an appropriate amine to form succinaldimines which are then reduced with concommitant cyclization to yield the desired products. Starting with an aldehyde the synthesis of the present compounds can be illustrated as follows:

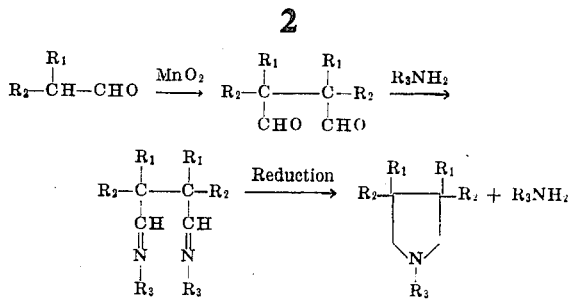

Hydrogenation (reduction) of the intermediate succinaldimine can be carried out at ambient temperatures in the presence of platinum, palladium, rhodium or ruthenium on carbon, or Raney nickel utilizing hydrogen pressures of two or three atmospheres. It is preferred to employ a solvent for the hydrogenation such as glacial acetic acid, ethanol containing small quantities of acetic acid or ethyl ether containing small quantities of acetic acid. Reduction of the succinaldimines can also be accomplished using, for example, an excess amount of aqueous formic acid or sodium borohydride in ethanol.

Hydrogenation of bis(1,1-dialkylhydrazones) with structures analogous to succinaldimines result in formation of pyrrolidines of the invention when glacial acetic acid is used as the reaction medium.

The following examples illustrate preparation of the novel compounds of the present invention. All temperatures are given in degrees Centigrade.

EXAMPLE I

Preparation of 1-Ethyl-3,3,4,4-tetramethylpyrrolidine

To a cooled, stirred 90 gram (0.46 mole) sample of N,N'-diethyltetramethylsuccinaldimine were added 95 grams (2.0 moles) of 88 percent formic acid over a three hour period. Stirring was continued for an additional 2 hours at room temperature before the addition of excess 50 percent aqueous sodium hydroxide. The product mixture was extracted with two 100-milliliter portions of ether, the combined extracts were washed with three 20-milliliter portions of water, and the ether solution was dried over anhydrous sodium sulfate. Removal of the ether and distillation of the crude product gave 46 grams (65 percent) of 1-ethyl-3,3,4,4-tetramethylpyrrolidine as a colorless liquid, boiling point 100°–105°/100 millimeters of mercury. Conversion to the hydrochloride salt was carried out by treatment with hydrogen chloride in ether to give 1-ethyl-3,3,4,4-tetramethyl-pyrrolidine hydrochloride in 66 percent yield. Recrystallization of this salt from ethanol-ether gave white crystals, melting point 210°–220°.

EXAMPLE II

In a manner similar to that of Example I, N,N'-dibenzyltetramethylsuccinaldimine was converted to 1-benzyl-3,3,4,4-tetramethylpyrrolidine, boiling point 79°–82°/0.5 millimeters of mercury (hydrochloride salt, melting point 178°–180°).

EXAMPLE III

Preparation of 1-Isopropyl-3,3,4,4-tetramethylpyrrolidine

To a mixture of 325 grams (3.7 moles) of manganese dioxide in 300 milliliters of hexane was added, with stirring, 193 grams (1.7 moles) of N-isobutylideneisopropylamine. The resulting mixture was stirred at reflux temperature for 20 hours at which time the solids were removed by suction filtration using a fritted glass funnel of medium porosity. The solids were washed with 400 milliliters of ether to remove any adhering product. Removal of the solvents from the combined filtrates and distillation of the residual oil afforded 150 grams (79 percent) of N,N'-diisopropyltetramethylsuccinaldimine as a colorless liquid, boiling point 101°–106°/11.0 millimeters of mercury.

To 67.2 grams (0.3 mole) of N,N'-diisopropyltetramethyl-succinaldimine was added, with cooling and stirring, 46 grams (1.0 mole) of 97 percent formic acid over a 30-minute period. Stirring was continued for 17 hours and the product was isolated in a manner analogous to Example I. A yield of 46.3 grams (91 percent) of 1-isopropyl-3,3,4,4-tetramethylpyrrolidine as a colorless liquid, boiling point 112°–4°/90 millimeters of mercury, was obtained. The pyrrolidine was converted to 1-isopropyl-3,3,4,4-tetramethylpyrrolidine hydrochloride in 82 percent yield by treatment with hydrogen chloride in ether. The salt was recrystallized from an isopropanol-ethanol-ether mixture to give white crystals, melting point 195°–205°.

EXAMPLE IV

Preparation of 1-n-Butyl-3,3,4,4-tetramethylpyrrolidine

A mixture consisting of 12.6 grams (0.05 mole) N,N'-di-n-butyl-2,2,3,3-tetramethylsuccinaldimine, 25 milliliters glacial acetic acid, and 0.4 gram 5 percent platinum on carbon was hydrogenated at 50 p.s.i.g. for 15 hours. The mixture was then diluted with 100 milliliters of ether and the catalyst was removed by filtration through a fritted glass funnel. Excess 40 percent aqueous sodium hydroxide was added to the filtrate and the ether layer was separated and washed with water before drying over anhydrous sodium sulfate. Removal of the solvent and distillation of the crude product yielded 7.0 grams (77 percent) of 1-n-butyl-3,3,4,4-tetramethylpyrrolidine as a colorless oil, boiling point 80°–1°/7.5 millimeters of mercury. Similar hydrogenations in acetic acid were carried out with the following catalysts to give the indicated yields of crude 1-n-butyl-3,3,4,4-tetramethylpyrrolidine: 5 percent palladium on charcoal (92 percent); 5 percent rhodium on carbon (95 percent); 5 percent ruthenium on carbon (48 percent); and Raney nickel (52 percent).

Conversion of the above pyrrolidine to the hydrochloride salt (in ether) and recrystallization from isopropanol-ether was effected in 82 percent yield to give 1-n-butyl-3,3,4,4-tetramethylpyrrolidine hydrochloride as white crystals, melting point 190°–210° (dec.).

EXAMPLE V

In a manner similar to that of Example IV, the following pyrrolidines were prepared from the corresponding succinaldimines: 1-cyclohexyl-3,3,4,4-tetramethylpyrrolidine (boiling point 98°–102°/2.2 millimeters of mercury), 1-isobutyl-3,4-di-n-butyl-3,4-diethylpyrrolidine (boiling point 118°–122°/0.25 millimeters of mercury), 1-n-butyl-3,4-dimethyl-3,4-di(4-isopropylbenzyl)pyrrolidine (boiling point 201°–206°/0.05 millimeters of mercury), 1-(3-pyridylmethyl)-3,3,4,4-tetramethylpyrrolidine (boiling point 100°–102°/0.5 millimeters of mercury), and 1-isobutyl-3,3,4,4-tetramethylpyrrolidine (boiling point 78°–79°/15.0 millimeters of mercury.

EXAMPLE VI

Preparation of 1-n-Butyl-3,4-dimethyl-3,4-diphenylpyrrolidine

Coupling of N-(2-phenylpropylidene)-n-butylamine (40 grams) via manganese dioxide was carried out in a manner similar to that described in Example III except that the crude product was not distilled but used directly in the hydrogenation step. The crude product was placed in 100 milliliters of glacial acetic acid with 2 grams of 5 percent platinum on carbon and hydrogenated at 50 p.s.i.g. and room temperature for 19 hours. The product was isolated as described in Example IV and was distilled under reduced pressure to give 23 grams (68 percent) of 1-n-butyl-3,4-dimethyl-3,4-diphenylpyrrolidine as a yellow oil, boiling point 155°–160°10.2 millimeters of mercury.

Using the procedure described above, the following compounds are prepared from the corresponding aldimines: 1-isopropyl-3,4-dibutyl-3,4-diamylpyrrolidine, 1-isopropyl-3,4-dimethyl-3,4-di(2-nitrobutyl)pyrrolidine, 1-ethyl-3,4-dimethyl-3,4-di(4-methoxyphenyl)pyrrolidine, 1-butyl-3,4-dimethyl-3,4-di(4-bromophenyl)pyrrolidine, 1-ethyl-3,4-dimethyl-3,4-di(4-isopropylphenyl)pyrrolidine, and 1-isopropyl-3,3,4,4-tetra-phenylpyrrolidine.

EXAMPLE VII

Preparation of 1-n-Dodecyl-3,3,4,4-tetramethylpyrrolidine

To a mixture of 20 grams (0.14 mole) of tetramethylsuccinaldehyde in 75 milliliters of ether was added 55 grams (0.3 mole) of dodecylamine. The resulting mixture was stirred at room temperature for 1 hour and was then dried over sodium hydroxide overnight. Isolation of the crude product gave 71 grams of yellow oil. Hydrogenation of this oil was carried out in 120 milliliters of glacial acetic acid containing 2 grams of 5 percent platinum on carbon. The hydrogenation was allowed to proceed for 22 hours at room temperature and 50 p.s.i.g. Isolation of the product in a manner analogous to that described in Example IV above gave 66 grams of crude material. Distillation of this material under reduced pressure gave 27.5 grams (67 percent) of 1-n-dodecyl-3,3,4,4-tetramethylpyrrolidine as a colorless oil, boiling point 125°–6°/0.1 millimeter of mercury. Conversion to the hydrochloride salt by passing hydrogen chloride gas into a hexane solution of the pyrrolidine gave an 86 percent yield of 1-n-dodecyl-3,3,4,4-tetramethylpyrrolidine hydrochloride as colorless leaflets, melting point 174°–175.5° (from ethyl acetate).

EXAMPLE VIII

In a manner analogous to that of Example VII, the following pyrrolidines were prepared from tetramethylsuccinaldehyde and the appropriate amines: 1-(2-hydroxyethyl)-3,3,4,4-tetramethylpyrrolidine (boiling point 95°–96°/5.0 millimeters of mercury) and 1-(2-phenylethyl)-3,3,4,4-tetramethylpyrrolidine (boiling point 133°–137°/2.0 millimeters of mercury).

EXAMPLE IX

Preparation of 1-(Dimethylamino)-3,3,4,4-tetramethylpyrrolidine

A mixture of 13 grams (0.09 mole) tetramethylsuccinaldehyde, 12 grams (0.2 mole) 1,1-dimethylhydrazine, and a few drops of glacial acetic acid was warmed gently on a steam bath for 1 hour. The mixture was cooled and 5 grams of crude product was collected by suction filtration. Treatment of the filtrate with an additional 10 grams of 1,1-dimthylhydrazine plus a small amount of 88 percent formic acid resulted in the isolation of an additional 6 grams of crude product. Recrystallization of the crude product from ether, using activated charcoal, gave 9.0 grams (44 percent) of tetramethylsuccinaldehyde bis(1,1-dimethyl-hydrazone) as colorless crystals, melting point 91°–93°.

A solution of 8.0 grams (0.0375 mole) of tetramethylsuccinaldehyde bis(1,1-dimethylhydrazone) in 50 milliliters of glacial acetic acid was hydrogenated over 0.8 gram of 5 percent platinum on carbon at 50 p.s.i.g. for 40 hours. The mixture was diluted with ether and the catalyst was removed by filtration. Excess 40 percent sodium hdyroxide was added to the filtrate, and the ether layer was separated and washed with water before drying over anhydrous sodium sulfate. Removal of the ether gave 4.5 grams of yellow oil and 1.35 grams (17 percent) of recovered dihydrazone. Distillation of the oil under reduced pressure yielded 3.95 grams (62 percent) of 1-(dimethylamino)-3,3,4,4-tetramethylpyrrolidine as a colorless liquid, boiling point 87°–89°/22.0 millimeters of mercury.

Using the foregoing procedure, 1-(diethylamino)-3,3,4,4-tetramethylpyrrolidine is prepared by substituting 1,1-diethylhydrazine for the 1,1-dimethylhydrazine.

EXAMPLE X

Preparation of 1-Phenyl-3,3,4,4-tetramethylpyrrolidine

A mixture of 7.1 grams (0.05 mole) of tetramethylsuccinaldehyde and 4.65 grams (0.05 mole) of aniline was heated on a steam bath for 30 minutes. This mixture was then cooled and to it was added, with stirring, 10 grams (0.19 mole) of 88 percent formic acid. The mixture was stirred at room temperature for 16 hours during which time a dark bluish-black color was generated. A solution of 5 grams of sodium hydroxide in 15 milliliters of water was added and the product was extracted with ether. Distillation of the crude product gave 4.3 grams (42 percent) of 1-phenyl-3,3,4,4-tetramethylpyrrolidine as a slightly yellow oil, boiling point 82°–85°/0.1 millimeter of mercury. This pyrrolidine was converted in 53% yield to the hydrochloride salt (using ether). The 1-phenyl-3,3,4,4-tetramethylpyrrolidine hydrochloride gave colorless crystals from ethanol-ether, melting point 85°–110°.

Utilizing the above method, the following compounds are prepared by substituting the appropriate amine for aniline: 1-(2,4-dichlorophenyl)-3,3,4,4-tetramethylpyrrolidine, 1-(p-biphenylyl)-3,3,4,4-tetramethylpyrrolidene, 1-(6-butoxy-3-pyridyl)-3,3,4,4-tetramethylpyrrolidine, 1-(2,4-dimethylphenyl)-3,3,4,4-tetramethylpyrrolidine, 1-(p-hydroxyphenyl)-3,3,4,4-tetramethylpyrrolidine, 1-(4-methyl-2-pyridyl)-3,3,4,4-tetramethylpyrrolidine, 1-(p-ethoxyphenyl)-3,3,4,4-tetramethylpyrrolidine, 1-(o-tolyl)-3,3,4,4-tetramethylpyrrolidine, and 1-(p-nitrophenyl)-3,3,4,4-tetramethylpyrrolidine.

Chemical compounds embraced by Formula I can be employed for lowering the level of cholesterol in the blood serum. Atherosclerosis is a significant form of cardiovascular disease and higher levels of cholesterol are observed in atherosclerosis patients than in normal persons. Control of blood cholesterol levels is felt to be important in the treatment and prevention of atherosclerosis.

To illustrate the ability of compounds embraced by this invention for lowering blood cholesterol levels, comparisons were made with a commercially available nonsteroidal compound which is presently employed for lowering serum cholesterol levels in humans. This compound is ethyl α-(4-chlorophenoxy)isobutyrate (CPIB). The test is carried out as follows:

Five male rats weighing 150–200 grams were used in each test group. In a typical test, the test compounds were administered at appropriate doses orally for five consecutive days. A control group and a standard group were run each time. The control group received only the solvent which was used to suspend the test compounds and the standard group received CPIB at 200 mg/kg. The animals were fasted overnight on the fourth night of the experiment, and on the fifth day the animals were bled via cardiac puncture under ether anesthesia two hours after the final drug administration. The sera were analyzed for cholesterol. The percentage change in serum cholesterol caused by the test compounds and by CPIB was calculated as follows:

$$\frac{\text{Serum cholesterol of control} - \text{Serum cholesterol of test}}{\text{Serum cholesterol of control}} \times 100$$

The results were as follows:

| Compound | Dose | Percent Reduction in Cholesterol Level |
|---|---|---|
| Product of Example X (PTMP) | 300 mg/kg | 31% |
| Product of Example X (PTMP) | 150 mg/kg | 22% |
| Product of Example X (PTMP) | 75 mg/kg | 2.5% |
| CPIB | 200 mg/kg | 23% |

Following the test procedure above outlined, CPIB was administered at 200 mg/kg and 1-phenyl-3,3,4,4-tetramethylpyrrolidine hydrochloride (PTMP) at 300 mg/kg for 32 consecutive days. PTMP lowered serum cholesterol by 42.5 percent whereas CPIB lowered it by 21 percent. The sera were also analyzed for glucose, urea nitrogen, calcium, bilirubin, total protein, alkaline phosphatase, serum glutamic-oxaloacetic transaminase, serum glutamic-pyruvic transaminase, and the livers were processed histologically. There was no apparent toxicity judging by appearance of the animals, the blood chemistries and microscopic examination of the liver tissue.

The following test results illustrate hypocholesterolemic responses in rats by different routes of administration.

| Compound | Dose | Route | Percent Change in Cholesterol Level |
|---|---|---|---|
| PTMP | 75 | Intraperitoneal | −12.5% |
| PTMP | 150 | Intraperitoneal | −6.3% |
| PTMP | 300 | Intraperitoneal | −8.8% |
| PTMP | 75 | Oral | +11.4% |
| PTMP | 150 | Oral | −7.6% |
| PTMP | 300 | Oral | −16.5% |
| CPIB | 200 | Oral | −2.5% |

The toxicity of the above compounds ($LD_{50}$ in rats) is approximately 1,500 mg/kg for CPIB and greater than 1,500 mg/kg for PTMP.

As is apparent from the foregoing, the novel pyrrolidine compounds of the invention can be readily converted to the salt form thereof. For example, acid addition salts such as the hydrochloride, sulfate, phosphate, acetate, propionate, tartrate, mucate, maleate and gluconate salts can be prepared by conventional means by reacting the free base form of the new compounds with an appropriate acid. Quaternary ammonium salts are prepared by reacting a pyrrolidine with an appropriate compound such as methyl chloride, methyl bromide, allyl chloride, benzyl chloride and the like.

Those modifications and equivalents which fall within the spirit of the invention are to be considered a part thereof.

WE CLAIM:

1. A compound selected from the group con-sisting of:
   a. a compound of the formula

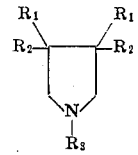

wherein $R_1$ and $R_2$ are alkyl groups containing from one to four carbon atoms and $R_3$ is phenyl or alkylphenyl containing not more than nine carbon atoms with or without substituents selected from halogen, nitro and lower alkoxy,
   b. a therapeutically acceptable salt of a compound defined in (a).

2. A compound of the formula

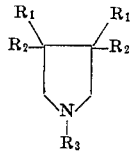

wherein $R_1$ and $R_2$ are methyl and $R_3$ is phenyl.

3. A compound in accordance with claim 2 in the form of its hydrochloride salt.

4. A compound in accordance with claim 1 wherein $R_1$ and $R_2$ are methyl groups and $R_3$ is benzyl.

5. A compound in accordance with claim 1 wherein $R_1$ and $R_2$ are methyl groups and $R_3$ is 2-phenylethyl.

* * * * *

UNITED STATES PATENT OFFICE
CERTIFICATE OF CORRECTION

Patent No. 3,674,806               Dated July 4, 1972

Inventor(s) Herbert J. Bluhm and Eugene R. Fluck

It is certified that error appears in the above-identified patent and that said Letters Patent are hereby corrected as shown below:

Column 2, line 50, "tetramethyl-pyrrolidine" should be -- tetramethylpyrrolidine --

Column 3, line 72, "155°-160°10.2" should be -- 155-160°/0.2 --

Column 4, line 6, "tetra-phenylpyrrolidine" should be -- tetraphenylpyrrolidine -- line 57, "dimethyl-hydrazone" should be -- dimethylhydrazone --

Column 5, line 23, "tetramethylpyrrolidene" should be -- tetramethylpyrrolidine -- lines 60-64 should read as follows:

$$\frac{\text{SERUM CHOLESTEROL OF CONTROL} - \text{SERUM CHOLESTEROL OF TEST}}{\text{Serum Cholesterol of Control}} \times 100$$

Column 6, in the table, the numbers appearing after "PTMP" and "CPIB" should be under the column headed "Dose"

line 44, "a", first occurrence, should be -- (a) -- line 57, "b." should be -- (b) --

Signed and sealed this 12th day of December 1972.

(SEAL)
Attest:

EDWARD M. FLETCHER, JR.
Attesting Officer

ROBERT GOTTSCHALK
Commissioner of Patents